United States Patent [19]

Ozaki

[11] Patent Number: 5,084,755
[45] Date of Patent: Jan. 28, 1992

[54] APPARATUS AND METHOD FOR COVERTING CINEMATIC IMAGES TO VIDEO SIGNALS

[75] Inventor: Yoshio Ozaki, Tokyo, Japan
[73] Assignee: Sony Corporation, Tokyo, Japan
[21] Appl. No.: 634,455
[22] Filed: Dec. 27, 1990

[30] Foreign Application Priority Data

Dec. 29, 1989 [JP] Japan .................................. 1-343924

[51] Int. Cl.⁵ .............................................. H04N 3/36
[52] U.S. Cl. ........................................ 358/214; 358/54
[58] Field of Search ................................... 358/214, 54

[56] References Cited

U.S. PATENT DOCUMENTS

| | | | |
|---|---|---|---|
| 4,275,422 | 6/1981 | Le Couteur | 358/214 |
| 4,476,493 | 10/1984 | Poetsch | 358/214 |
| 4,630,120 | 12/1986 | Childs | 358/214 |
| 4,633,293 | 12/1986 | Powers | 358/214 |
| 4,680,638 | 7/1987 | Childs | 358/214 |
| 4,998,287 | 3/1991 | Katznelson | 358/214 |

Primary Examiner—Howard W. Britton
Attorney, Agent, or Firm—Alvin Sinderbrand; William S. Frommer

[57] ABSTRACT

An apparatus and method for converting images recorded in a plurality of frames in a cinematic film into an output video signal having a plurality of fields. A predetermined number of fields of a video signal are generated from each of the plurality of frames of the film such that the predetermined number of fields generated from odd numbered frames differ from the predetermined number of fields generated from even numbered frames by a number n, where n is a positive integer. An interpolated video signal is generated from a plurality of the generated fields of the video signal which include fields generated from at least two essential frames. The interpolated video signal has a duration of n multiplied by the duration of a field. The interpolated video signal is combined with at least some of the predetermined number of fields of the video signal to form the output video signal.

5 Claims, 5 Drawing Sheets

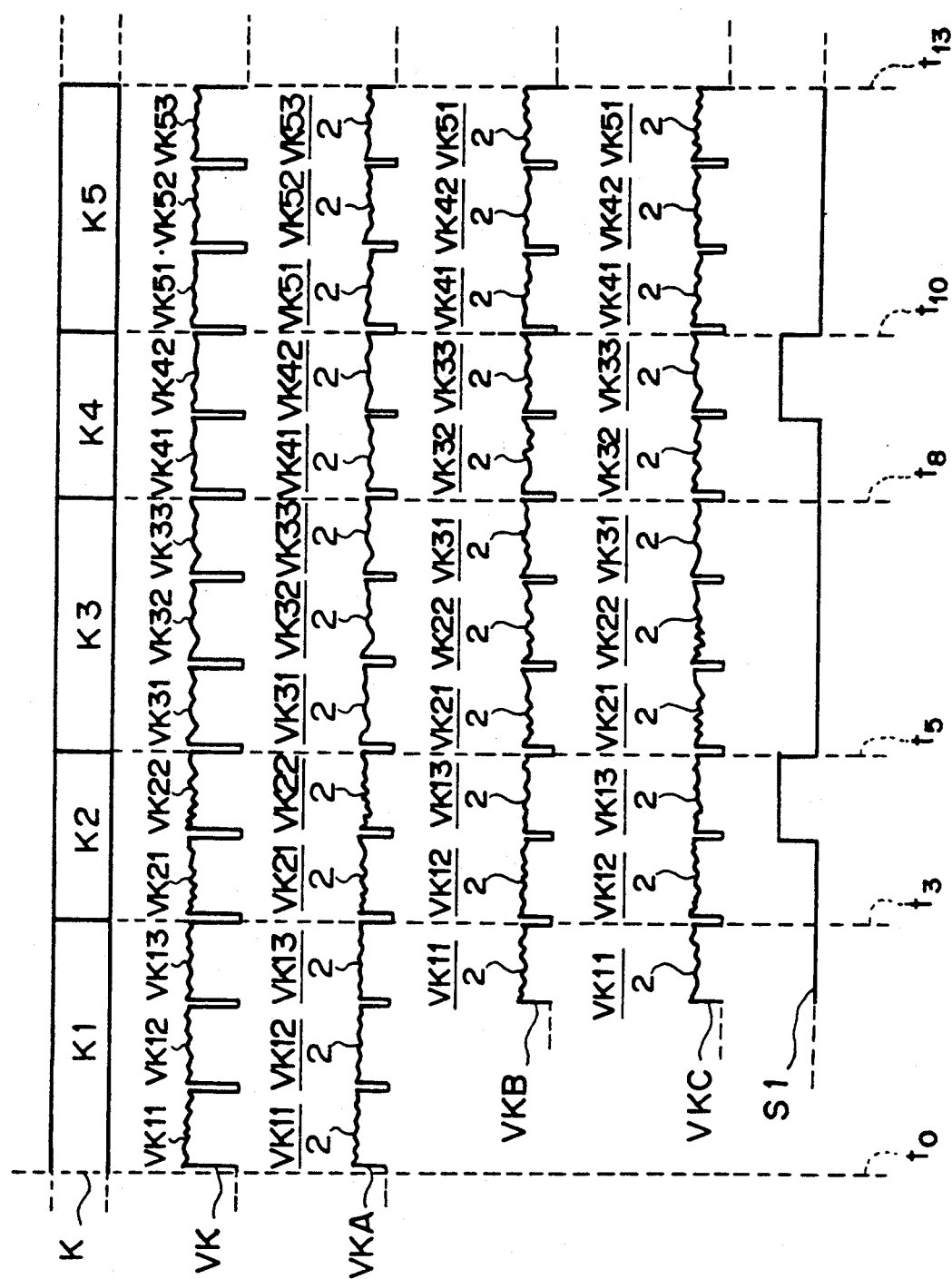

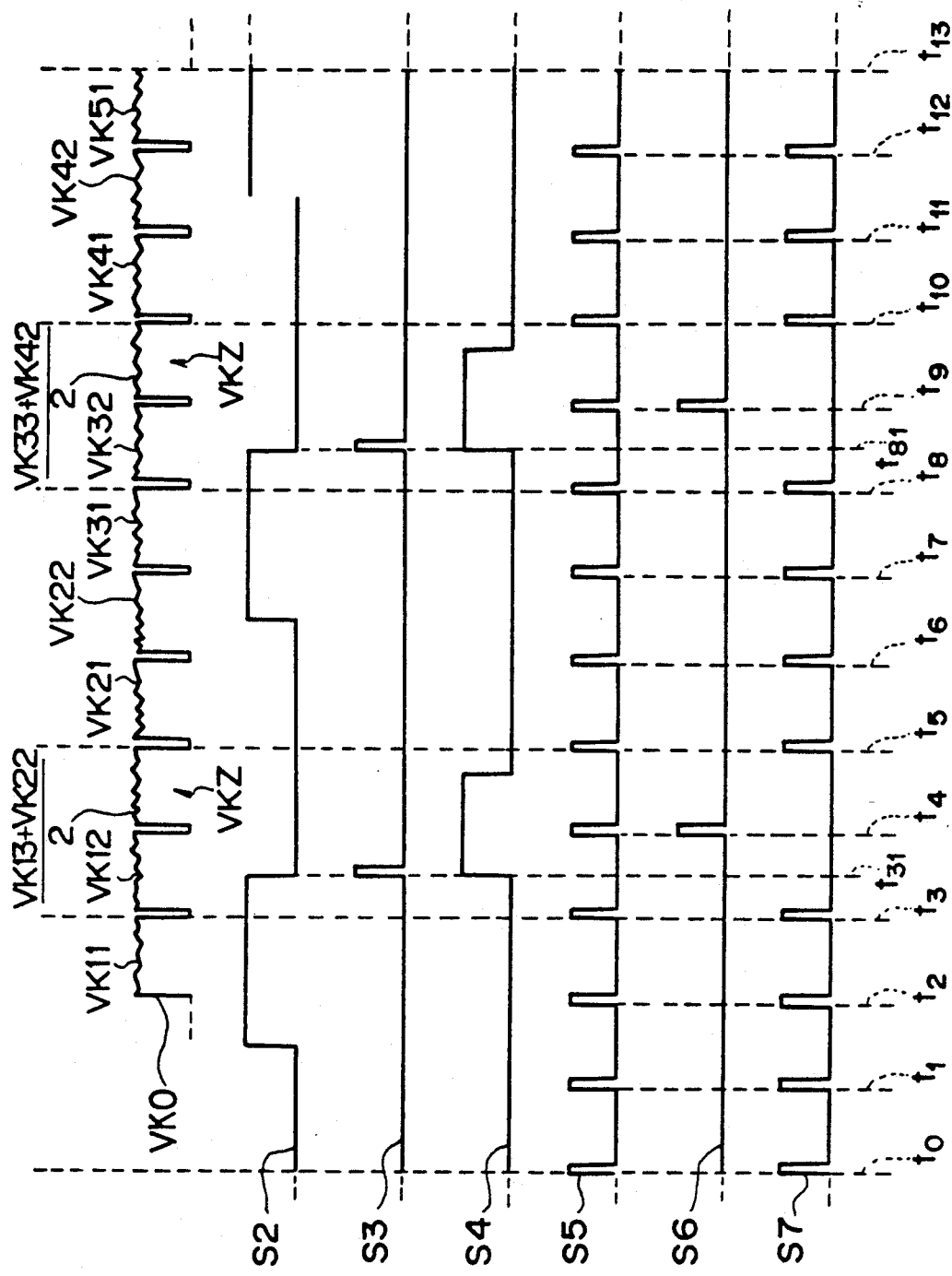

APPARATUS AND METHOD FOR COVERTING CINEMATIC IMAGES TO VIDEO SIGNALS

BACKGROUND OF THE INVENTION

The present invention relates to apparatus and methods for converting images recorded on a frame-by-frame basis in cinematic film into field sequential video signals.

Image information recorded on cinematic film typically is converted into video signals by means of the so-called 2-3 pull-down conversion method. With reference to FIG. 1, this technique converts image information from the cinematic film recorded in sequential frames Ka (a=1, 2,...), obtained by "pulling down" the cinematic film at 24 frames per second, to 60 fields of video signals VKn (n=1, 2,...) per second. That is, a pull down mechanism holds each of the sequential frames of the film in a projector gate to alternately permit 2 and 3 field exposures thereof. As illustrated in FIG. 1, from each of the odd numbered frames Ka three identical frames of image data, Km1, Km2 and Km3, where m=1, 3, 5,..., are converted into three respective fields of video signals, VKm1, VKm2 and VKm3. From each of the even numbered frames, two identical frames of image data, Kn1 and Kn2, where n=2, 4, 6,..., are converted into two respective fields of video signals, VKn1 and VKn2.

Accordingly, image information obtained from a first frame K1 of the cinematic film is converted into three fields of video signals VK11, VK12 and VK13, and subsequently image information obtained from a next frame K2 is converted into two fields of video signals VK21 and VK22. Thus, after an image from a first frame of the film is visually displayed for 3/60 of a second, a subsequent image from the second frame is displayed for only 2/60 of a second. Hence, the first image which is displayed for 3/60 of a second provides a stronger visual image than the next image displayed for only 2/60 of a second. As a result, moving objects in the reproduced image produced by such video signals do not appear to move smoothly. Consequently, the video image thus produced suffers from flickering.

In a conventional technique for solving this problem, video signals representing a moving object in the image are extracted, and a displacement of the moving object represented thereby is averaged over time to produce a displacement vector which is fed back to appropriately modify the video signals. It will be appreciated that this technique requires the use of relatively complex, and correspondingly expensive, signal processing equipment for correcting video signals in which a significant number of small objects undergo displacement in differing directions.

OBJECTS AND SUMMARY OF THE INVENTION

Accordingly, it is an object of the present invention to provide apparatus and methods for converting cinematic images to video signals which overcome the foregoing problems associated with conventional techniques.

It is another object of the present invention to provide such apparatus and methods which produce high quality video signals with the use of relatively simple apparatus.

In accordance with one aspect of the present invention, an apparatus is provided for converting images recorded in a plurality of frames in a cinematic film into an output video signal having a plurality of fields, the plurality of frames being provided as a sequence of alternating odd and even frames, comprising: video signal generating means for generating a respective predetermined number of fields of a video signal from each of the plurality of frames, each of the fields having a predetermined field duration, the predetermined number of fields generated from each of the odd frames differing from the predetermined number of fields generated from each of the even frames by a number n, where n is a positive integer; interpolating means for generating an interpolated video signal from a plurality of the generated fields of the video signal, the plurality of the generated fields of the video signal including fields generated from at least two sequential frames of the plurality of frames, the interpolated video signal having a duration of n multiplied by the predetermined field duration; and combining means for combining the interpolated video signal with at least some of the fields of the video signal generated by the video signal generating means to form the output video signal.

In accordance with another aspect of the present invention, a method for converting images recorded in a plurality of frames in a cinematic film into an output video signal having a plurality of fields, the plurality of frames being provided as a sequence of alternating odd and even frames, comprises the steps of: generating a respective predetermined number of fields of the video signal from each of the plurality of frames, each of the fields having a predetermined field duration, the predetermined number of fields generated from each of the odd frames differing from the predetermined number of fields generated from each of the even frames by a number n, where n is a positive integer; generating an interpolated video signal from a plurality of the generated fields of the video signal including fields generated from at least two sequential frames of the plurality of frames, the interpolated video signal having a duration of n multiplied by the predetermined field duration; and combining the interpolated video signal with at least some of the generated fields of the video signal to form the output video signal.

In a preferred embodiment of the present invention, images recorded in each of Ka (a=1, 2, 3,...) sequential frames of a cinematic film which is pulled down at a predetermined frame rate are each converted into a respective set of generated video field signals VK(a) (a=1, 2, 3,...) each including a predetermined number of video fields. A pair of video field signals each selected from a respective set of a pair of sets of the generated video field signals each corresponding with a respective one of two sequential frames of the cinematic film are interpolated by averaging the same to produce interpolated video field signals VKZ. The interpolated video field signals VKZ are then combined with the generated video field signals to form an output video signal. In this manner, it is possible to produce high quality video signals exhibiting a relatively small amount of flicker in the image produced thereby.

The foregoing, as well as further objects, features and advantages of the invention, will be apparent in the following detailed description of certain illustrative embodiments thereof which is to be read in connection with the accompanying drawings forming a part hereof, and wherein corresponding parts and components are identified by the same reference numerals in the several views of the drawings.

BRIEF DESCRIPTION OF THE DRAWINGS

FIGS. 3A through 3M are waveform diagrams having a common time base illustrating the operation of the apparatus of FIG. 2;

DETAILED DESCRIPTION OF CERTAIN PREFERRED EMBODIMENTS

Figure 1:
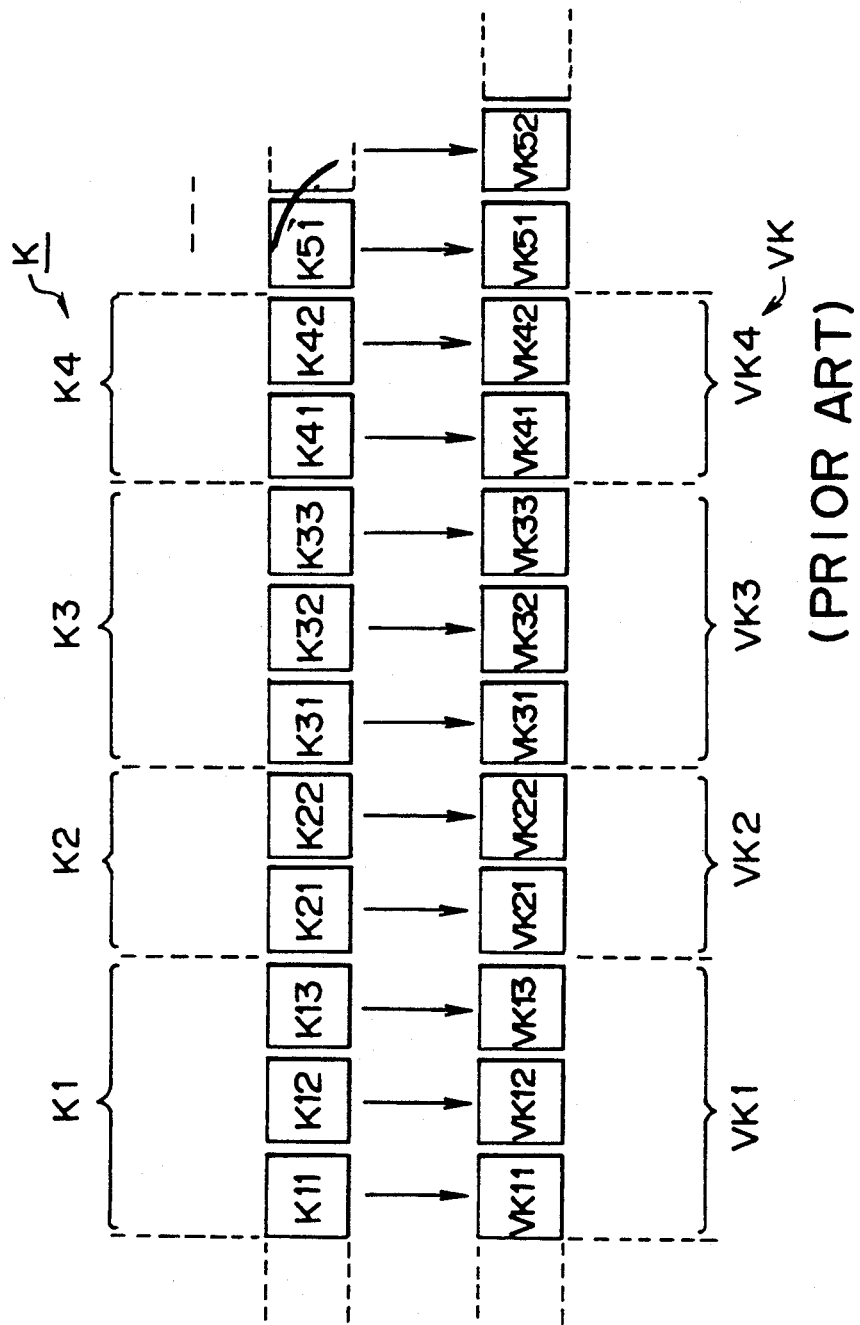
FIG. 1 is a timing chart which generally illustrates a conventional 2-3 pulldown method for converting cinematic images into video signals.
Figure 2:
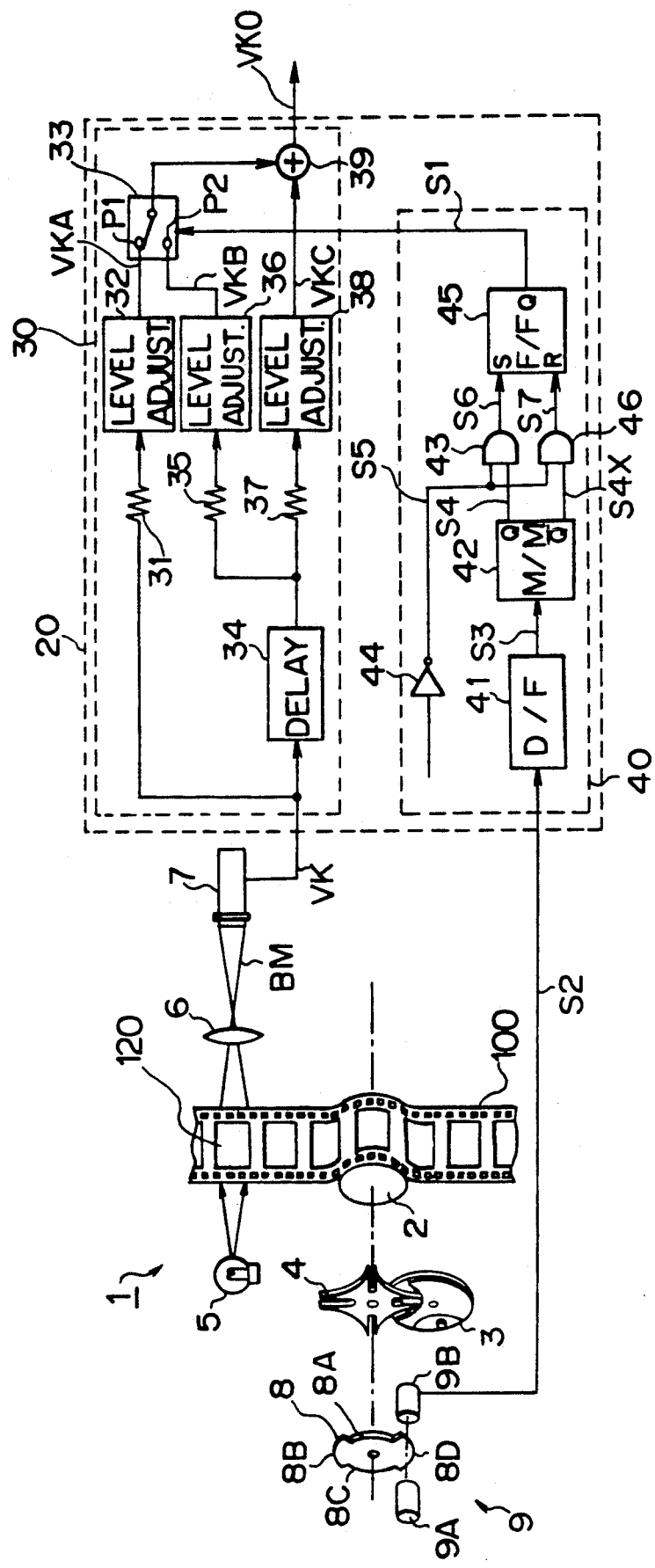
FIG. 2 is a block diagram of an apparatus for converting images recorded in frames of a cinematic film into a field sequential video signal in accordance with a first embodiment of the present invention.

With reference to FIG. 2, an apparatus for converting cinematic film images to field sequential video signals is illustrated therein including a cinematic image conversion system 1 which is operative to convert images recorded in sequential frames of a cinematic film 100 into video signals VK. The conversion system 1 includes a drive wheel 3 including a pair of drive pins which alternately engage respective slots in a follower wheel 4 coupled with a sprocket 2. The sprocket 2 engages sprocket holes in peripheral portions of the film 100 in order to advance or "pull down" the same, as described in greater detail below.

A light source 5 is positioned to project a beam of light BM through a respective frame 120 of the film 100 temporarily held in a projector gate (not shown for purposes of simplicity and clarity) onto a lens 6 which focuses the beam on a image pickup tube 7. The image pickup tube 7 converts the beam BM into video signals VK which it provides at an output thereof The rotation of the drive wheel 3 serves to intermittently rotate the follower wheel 4, thus to pull down the film 100 to sequentially position the frames of the film 100 between the light source 5 and lens 6 in the projector gate to enable the pickup tube 7 to produce a plurality of fields of the video signal VK from the images recorded on each of the frames. The follower wheel 4 is intermittently rotated through one revolution in response to two revolutions of the drive wheel 3, during the course of which the sprocket 2 intermittently pulls down four frames of the film 100.

The apparatus of FIG. 2 further includes an interpolated signal producing circuit 30 having an input terminal coupled with the output of the image pickup tube 7 to receive the video signals VK therefrom. A level adjusting circuit 32 has an input coupled with the input terminal of the circuit 30 through a resistor 31 to receive the video signal VK and is operative to reduce its amplitude by a factor of one-half thus to provide the reduced amplitude signals as a current video signal VKA at an output thereof. A switching circuit 33 has a first fixed input terminal PI coupled with the output of the level adjusting circuit 32 to receive the current video signal VKA therefrom.

The circuit 30 also includes a delay circuit 34 having an input coupled with the input terminal of the circuit 30 to receive the video signal VK and is operative to delay the video signal VK by one frame interval (that is, 2 field intervals) which it then provides at an output thereof. A second level adjusting circuit 36 has an input coupled through a resistor 35 with the output of the delay circuit 34 to receive the delayed video signal therefrom and is operative to reduce the amplitude of the delayed video signal by one-half, thus to produce a delayed video signal VKB at an output thereof. A second fixed input terminal P2 of the switching circuit 33 is coupled with the output of the second level adjusting circuit 36 to receive the delayed video signal VKB therefrom. A third level adjusting circuit 38 has an input coupled through a resistor 37 with the output of the delay circuit 34, thus to receive the delayed video signal therefrom and is likewise operative to reduce the amplitude thereof by one-half thus to produce another delayed video signal VKC which it provides at an output thereof. An adding circuit 39 has a first input coupled with the output of the level adjusting circuit 38 to receive the delayed video signal VKC therefrom. A second input of the adding circuit 3 is coupled with an output terminal of the switching circuit 33.

The switching circuit 33 also includes a control input which receives a switching signal S1, produced as described below, in response to which the switching circuit 33 either couples its first fixed input terminal P1 to its output or its second fixed input terminal P2 to its output. Accordingly, depending on the state of the switching signal S1, the adding circuit 39 either provides (i) a video signal representing the sum of the delayed video signals VKB and VKC, which is thus equivalent to the video signal VK delayed by two field intervals, or (ii) an interpolated video signal VKZ obtained by adding the current video signal VKA and the delayed video signal VKC.

A photointerrupter 9 includes a light emitting element 9A and a light receiving element 9B disposed to receive the light emitted by the element 9A and to provide a signal S2 at an output thereof representing the intensity of the light received thereby from the element 9A. A rotary shutter plate has a rotational axis coupled with the follower wheel 4 so that it rotates therewith. The rotary shutter plate 8 includes four radially extending arcuate sections 8A through 8D. The light emitting and receiving elements 9A and 9B are disposed relatively near but offset from the axis of the rotary shutter plate 8, so that sections 8B and 8D thereof which extend a relatively large radial distance from its axis intercept the light emitted from element 9A with the rotation of the rotary shutter plate 8. Sections 8A and 8C extend a radially smaller distance from the axis of the rotary shutter plate 8 so that they do not interrupt the transmission of light from the element 9A to element 9B. The ratio of the angular extent of the sections 8A and 8C to the angular extent of sections 8B and 8D is 3 : 2, so that the intermittent rotation of the sprocket 2 and follower wheel 4 produces a discrimination signal S2 as illustrated in the waveform diagram of FIG. 3H signifying the angular disposition of the follower wheel 4 and sprocket 2.

The apparatus of FIG. 2 further includes a video signal switching control circuit 40 including a differentiating circuit 41 having an input coupled with the output of the light receiving element 9B to receive the discrimination signal S2 therefrom and is operative to provide a differentiated signal S3 at an output thereof, as illustrated in the waveform diagram of FIG. 3I, whose leading edge coincides with the trailing edge of the discrimination signal S2. A monostable multivibrator 42 of the control circuit 40 has an input coupled with the output of the differentiating circuit 41 to receive the differentiated signal S3 therefrom and is operative to produce a noninverted monostable pulse S4 (FIG. 3J) which rises to a logic "1" level at the leading edge of the discrimination signal S3 and remains in the logic "1" state for a predetermined interval after which it falls to a logic "0" state. The monostable multivibrator 42 provides the pulse S4 at a Q output terminal thereof coupled with a first input terminal of an AND gate 43 to supply the pulse S4 as an input thereto. The monostable multivibrator 42 also produces an inverted version of the pulse S4 in the form of a signal S4X which it supplies at an inverting output terminal, Q-not, coupled with a first input terminal of a further AND gate 46.

The control circuit has an input terminal 101 at which it receives a vertical synchronizing pulse of the video signal VK and which is coupled with an input of an inverter 44 which serves to provide a vertical synchronizing pulse detecting signal S5, as illustrated in the waveform diagram of FIG. 3K. The inverter 44 supplies the signal S5 at an output thereof coupled with respective second inputs of the AND gates 43 and 46. A flip-flop circuit 45 has a set (S) input connected with an output terminal of the AND gate 43 and a reset input terminal (R) coupled with an output of the AND gate 46. The flip-flop circuit 45 also has a Q output connected with the control input of the switching circuit 33 to provide the switching signal S1 thereto as the output of the control circuit 40.

The control circuit 40 provides the control signal S1 in the form illustrated in FIG. 3F which remains at a logic "0" level except during the second video field interval of the video signal VK produced from each even numbered frame, K2, K4,..., of the cinematic film. With reference to FIGS. 3H and 3J, the monostable multivibrator 42 provides the signal S4 having a logic "1" state commencing with the trailing edge of the signal S2 from the photointerrupter 9 prior to the commencement of the second field of the video signal VK produced from each even numbered frame of the cinematic film. The signal S4 remains in a logic "1" state until after receipt of the next vertical synchronizing pulse detecting signal S5, such that the signal S6 provided by the AND gate 43 rises to a logic "1" state upon receipt of the pulse S5 coinciding with the commencement of the second video field produced from each even numbered frame of the film 100, for example, at time $t_4$ of FIGS. 3A through 3M. Therefore, the flip-flop circuit 45 is set at time $t_4$ so that the control signal S1 then rises to a logic "1" level, as illustrated in FIG. 3F. With reference again to FIG. 3J, the pulse S4 provided at the Q output terminal of the monostable multivibrator 42 times out prior to the completion of the second field of the video signal VK produced from each even numbered frame of the film 100, thereupon to return to a logic "0" level. Accordingly, upon receipt of the subsequent pulse S5, the Q-not output terminal of the monostable multivibrator 42 (signal S4X) is then at a logic "1" state, so that the AND gate 46 produces a reset pulse (refer to signal S7 of FIG. 3M) thus to reset the flip-flop 45 so that the control signal S1 then returns to a logic "0" level.

The cinematic image conversion system 1, as noted above, feeds the cinematic film 100 on a frame-by-frame basis intermittently through a projector gate while a light source 5 projects a beam of light BM therethrough onto an image pickup tube 7, such that the images cinematically recorded in each sequential frame K1, K2, ..., are converted to respective sets of video signals, VK1, VK2, ..., as illustrated in FIG. 3B. The drive pins on the drive wheel 3 which engage the slots in the follower wheel 4 are spaced angularly with respect to the circumference of the drive wheel 3 so that the intermittent rotation of the follower wheel 4 in response to the rotation of the drive wheel 3 serves to maintain succeeding odd and even numbered frames of the film 100 in the projector gate for respective intervals of 3 and 2 fields of the video signals VK. Accordingly, from the cinematic images of the first frame K1 a respective set VK1 including three video field signals VK11, VK12 and VK13, is produced (refer to FIG. 3B), while from the images recorded in the subsequent even-numbered frame K2 a respective set VK2 including two fields of video signals VK21 and VK22, is produced. Similarly, the images of subsequent frames K3, K4, K5,..., are converted into respective sets, VK3, VK4, VK5,..., each alternately including three video field signals and two video field signals.

With reference again to FIG. 2, the switching circuit 33 responds to the control signal S1 by (i) coupling its first fixed input terminal P1 to its output whenever the control signal S1 is in a logic "1" state, and (ii) coupling its second fixed input terminal P2 to its output whenever the control signal S1 is in a logic "0" state. As explained above, the delay circuit 34 delays the sequentially received video field signals VK11 and VK12 by two video field intervals. For example, the start of video field signal VK11 is delayed from time $t_0$ to time $t_2$ before it is provided by the delay circuit 34 to the level adjusting circuits 36 and 38 to produce a level adjusted video field signal VK11/2 as the signals VKB and VKC, depicted in FIGS. 3D and 3E. With reference again to FIG. 3F, it will be seen that during the time interval $t_2$–$t_4$, the control signal S1 remains at a logic "0" level so that switching circuit 33 couples its second fixed input terminal P2 to its output terminal so that the signals VKB and VKC from the level adjusting circuits 36 and 38 are input to the adding circuit 39 thus to produce a video output signal VKO at the output terminal of the adding circuit 39 (refer also to FIG. 3G) corresponding with the delayed video field signals VK11 and VK12 produced from the images of the first frame K1.

During the time interval $t_4$–$t_5$, it will be seen with reference to FIG. 3F that the control signal S1 is then at a logic "1" level, so that at that time the switching circuit 33 couples its first input terminal P1 with its output terminal. Accordingly, during this interval the video signals VKA and VKC are simultaneously supplied to respective input terminals of the adding circuit 39, thus to provide an interpolated video signal equal to (VK13+VK22)/2 as the video output signal VKO as shown in FIG. 3G. That is, during the interval $t_4$–$t_5$, the video output signal VKO is provided as an average of two video field signals generated from two sequential frame images recorded on the cinematic film 100. During the interval $t_5$–$t_7$, the control signal S1 returns to a logic "0" level so that the switching circuit 33 again connects its second fixed input terminal P2 to its output and the adding circuit 39 again provides two sequential video field signals, VK21 and VK22, delayed by two video field intervals as the output video signal VKO.

Thereafter, during each successive interval of five video fields, the interpolated signal producing circuit 30 produces the video output signal VKO in the same manner. For example, during the next succeeding five video field intervals, $t_7$-$t_{12}$, the circuit 30 first provides two successive video field signals, VK31 and VK32, produced from the third frame of the film 100; in the following video field interval, the circuit 30 provides an interpolated video signal, (VK33+VK42)/2, that is, an average of one video field signal, VK33, generated from the third frame of the film 100 and another video field signal VK42 produced from the fourth frame of the film 100; and in the last two video field intervals, the circuit 30 successively provides two video field signals, VK41, VK42, generated from the fourth frame of the film 100.

Figure 4:
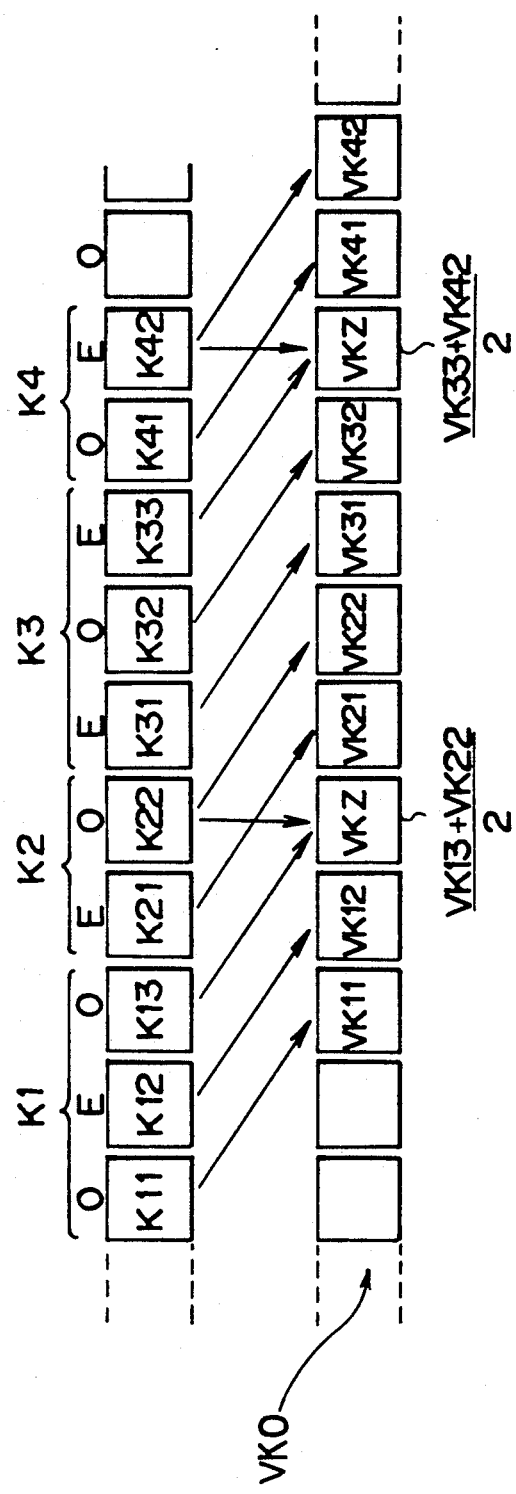
FIG. 4 is a timing chart which illustrates a method for converting images recorded in frames of a cinematic film into a field sequential video signal utilizing the apparatus of FIG. 2.

With reference now to FIG. 4, the overall manner in which the images recorded in the sequential frames K1, K2,..., of the film 100 are converted to a sequence of video field signals VK, is illustrated therein. As illustrated in FIG. 4, from each of the odd numbered frames Km (m=1, 3,...) three sequential sets of image data, Km1, Km2 and Km3, are produced by projecting beams of light through each frame and converted to respective video field signals VKm1, VKm2 and VKm3, while from each of the even numbered frames, Kn (n=2, 4,...) two sequential sets of image data, Kn1 and Kn2, are similarly produced and converted to two respective video field signals VKn1 and VKn2, such that the sequential video field signals VKm1, VKm2, VKm3, VKn1 and VKn2, are provided alternately as odd and even video fields, as denoted by the letters "O" and "E" in FIG. 4. The video field signals thus produced are then combined to produce the output video signals VKO as a repeating sequence of five video field signals, VKm1, VKm2, VKZ =(VKm3+VKn2)/2, VKn1 and VKn2. It will be seen from the foregoing that the number of video field signals produced from each frame of the cinematic film 100 is equal, thus to avoid flickering of the image produced by the video output signals VKO which would otherwise be caused by intensely reproducing the images of only certain ones of the frames in the film 100. From the foregoing, it will be appreciated that video signals capable of providing high picture quality are produced from a sequence of images recorded on cinematic film with the use of an apparatus having a relatively simplified configuration.

Figure 5:
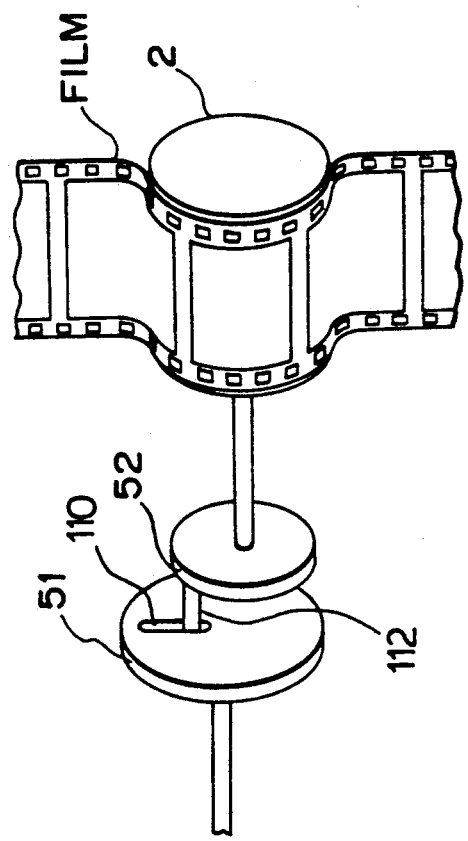
FIG. 5 is a perspective view of a nonuniform feed mechanism in accordance with a second embodiment of an apparatus in accordance with the present invention.

Although a photointerrupter is utilized in the embodiment of FIG. 2 for determining the rotational position of the follower wheel 4 and sprocket 2, it will be appreciated that various other equivalent means may be employed for this purpose. For example, such means may utilize electrical and mechanical sensors, as well as other forms of optical devices With reference now to FIG. 5, an alternative embodiment of the present invention is illustrated therein in which an intermittent feed mechanism employing a pair of rotary discs 51 and 52 is illustrated therein for use in place of the drive wheel 3 and follower wheel 4 of the FIG. 2 embodiment. In the embodiment of FIG. 5, the sprocket 2 is mounted coaxially with the rotary disc 52 for rotation therewith. The rotary disc 51 is mounted on an axis which is offset from the axis of the disc 52 and sprocket 2. The disc 51 is provided with a slot 110 which receives an axially offset pin 112 of the rotary disc 52 in order to convert rotation of the disc 51 to nonuniform rotation of the disc 52 and sprocket 2.

In the embodiments described hereinabove, video signals produced from first and second frames of a cinematic film are converted to five sequential video field signals in which the third field signal is produced by forming an average of two video field signals generated from the first and second frames. However, the present invention is not limited to the foregoing embodiment and may be implemented effectively by modifying the manner in which signals are combined in order to reduce flickering in the image produced with the use of the output video signal. For example, the video signals VKA and VKC may instead be mixed in a selected one of various ratios 4 : 6, 6 : 4, etc., in order to produce the interpolated video signals VKZ. In addition, although the disclosed embodiments provide a single field of interpolated video signals VKZ included in every five sequential fields, interpolated video signals VKZ of other selected durations may instead be combined with uninterpolated video signals to produce output video signals which do not exhibit visible flickering. Moreover, although the disclosed embodiments serve to convert images recorded on cinematic film at a frame rate of 24 frames per second to field sequential video signals provided at a rate of 60 fields per second, the present invention is not s limited and may be applied for converting images on cinematic film to video signals of differing frame and field rates. It will also be appreciated that the circuitry employed with the present invention may be implemented either in the form of analog or digital circuitry or a combination thereof.

Although specific embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An apparatus for converting images recorded in a plurality of frames in a cinematic film into an output video signal having a plurality of fields, said plurality of frames being provided as a sequence of alternating odd and even frames, comprising:

video signal generating means for generating a respective predetermined number of fields of a video signal from each of said plurality of frames each of said fields having a predetermined field duration, the predetermined number of fields generated from each of the odd frames differing from the predetermined number of fields generated from each of the even frames by a number n, where n is a positive integer;

interpolating means for generating an interpolated video signal from a plurality of the generated fields of s id video signal, said plurality of the generated fields of said video signal including fields generated from at least two sequential frames of said plurality of frames, said interpolated video signal having a duration of n multiplied by said predetermined field duration; and combining means for combining the interpolated video signal with at least some of the fields of said video signal generated by said video signal generating means to form said output video signal.

2. An apparatus according to claim 1, wherein said video signal generating means is operative to generate three fields of said video signal from each of said odd frames, and is further operative to generate two fields of said video signal from each of said even frames.

3. An apparatus according to claim 2, wherein said interpolating means is operative to generate said interpolated video signal having a duration of one field from a last one of the three fields generated from a respective one of said odd frames and a last one of the two fields generated from a respective one of said even frames, and said combining means is operative to form said output video signal by combining said interpolated video signal with said at least some of the fields of said video signal generated by said video signal generating means in place of the last one of the fields generated from the respective ones of the odd and even frames.

4. An apparatus according to claim 3, wherein said interpolating means is operative to generate said interpolated video signal as an average of the last ones of the fields generated from said respective ones of the odd and even frames.

5. A method for converting images recorded in a plurality of frames in a cinematic film into an output video signal having a plurality of fields, said plurality of frames being provided as a sequence of alternating odd and even frames, comprising the steps of:

generating a respective predetermined number of fields of said video signal from each of said plurality of frames, each of said fields having a predetermined field duration, the predetermined number of fields generated from each of the odd frames differing from the predetermined number of fields generated from each of the even frame by a number n, where n is a positive integer;

generating an interpolated video signal from a plurality of the generated fields of said video signal including fields generated from at least two sequential frames of said plurality of frames, said interpolated video signal having a duration of n multiplied by said predetermined field duration; and combining the interpolated video signal with at least some of the generated fields of said video signal to form said output video signal.

* * * * *